United States Patent [19]
Romero

[11] Patent Number: 4,938,564
[45] Date of Patent: Jul. 3, 1990

[54] GIMBAL ASSEMBLY

[75] Inventor: Charles Romero, Downey, Calif.

[73] Assignee: Hughes Aircraft Company, Los Angeles, Calif.

[21] Appl. No.: 36,728

[22] Filed: Apr. 10, 1987

[51] Int. Cl.$^5$ .............................................. G02B 7/02
[52] U.S. Cl. ..................................... 350/252; 350/247
[58] Field of Search ............... 350/247, 252, 321, 255; 372/107–109; 354/103

[56] References Cited

U.S. PATENT DOCUMENTS

| | | | |
|---|---|---|---|
| 3,783,404 | 1/1974 | Matsuoka | 372/107 |
| 4,088,396 | 5/1978 | Edelstein | 350/252 |
| 4,134,129 | 1/1979 | Filipovich | 354/103 |
| 4,331,384 | 5/1982 | Eisler | 350/321 |
| 4,614,403 | 9/1986 | Kersten | 350/252 |

FOREIGN PATENT DOCUMENTS

| | | | |
|---|---|---|---|
| 0177815 | 4/1986 | European Pat. Off. | |
| 1273278 | 8/1961 | France | 350/252 |
| 2044159 | 2/1971 | France | |
| 8404991 | 5/1984 | PCT Int'l Appl. | |
| 1210113 | 2/1986 | U.S.S.R. | |
| 1304716 | 1/1973 | United Kingdom | |

OTHER PUBLICATIONS

Vasilenko et al, "Device for Adjusting a Resonator and Returning the Frequency of a Laser," *Instruments and Experimental Techniques,* vol. 27, No. 5, Sep.–Oct., 1984, pp. 1267–1268.
Grundon et al, "Adjustable Optics Mounting Assembly for Vacuum Use," *IBM Technical Disclosure Bulletin,* vol. 23, No. 11, Apr. 1981, pp. 4941–4942.
WO86/00982, Lussorio, P., "Apparatus for Adjusting the Direction of a Light Beam Emitted by A Laser Tube", 2-13-86.
Via, G. G., "Laser Beam Steering System", IBM Tech. Disc. Bull., 11-1980, p. 2374.

*Primary Examiner*—Bruce Y. Arnold
*Assistant Examiner*—Martin Lerner
*Attorney, Agent, or Firm*—W. J. Streeter; W. J. Denson-Low

[57] ABSTRACT

A crystal modulator (20) is on an axis (19) which is positioned in translation and pivotal rotation with respect to another axis (17) of a laser. The crystal modulator (20) is supported in an inner housing (18) on axis (19). The inner housing is supported within an outer housing (16) which is affixed to the laser. Mating surfaces (32, 38) on the inner and outer housings are spherically contoured so that the inner housing may be pivoted about the center (24) of the extended sphere of the mating surfaces and thereby pivot axis (19) into coincidence with axis (17). An end (22) of the crystal modulator is positioned at this spherical center. Of two sets of four setscrews (26, 28) threaded into the outer housing, one set is disposed to contact the inner housing directly. The other set of screws is disposed to contact a ring (36) whose inner surface comprises one of the spherical surfaces. By adjustment of the screws, the axis of the inner housing may be linearly moved in a radial direction toward the laser optical axis until at least both axes intersect at the centerpoint (34) of the spherical surfaces. The set of setscrews (28) are adjusted to pivot the axis of the inner housing about the centerpoint of the spherical surfaces until the axes coincide.

8 Claims, 3 Drawing Sheets

GIMBAL ASSEMBLY

BACKGROUND OF THE INVENTION

The present invention relates to a gimbal assembly for precise positioning of a device on an axis and, in particular, for precisely adjusting the device's position.

Many apparati require the precise positioning of one element with respect to another, and this is particularly true with respect to optical and electro-optical systems. For example, the output from a laser may be directed along a path to a modulator crystal. It is essential in such systems that the axis of the modulator crystal be coincident with the optical axis of the laser. To obtain such coincidence, the modulator crystal axis must be aligned with the laser optical axis. Such alignment usually requires both lateral/translational adjustments and rotational adjustments.

Design criteria make it preferable, and sometimes essential in some environments, that the design of the adjusting and mounting of the modulator with respect to the laser be compact, light, simple, and rugged to withstand disturbances thereon.

SUMMARY OF THE INVENTION

The present invention achieves these and other objectives by housing the device to be aligned, e.g., a crystal modulator, on an axis and positioning the axis in translation and pivotal rotation with respect to another axis, e.g., of a laser.

Specifically, in the preferred embodiment, the crystal modulator is supported in an inner housing on an axis which is common to both the inner housing and the modulator. The inner housing is supported within an outer housing whose axis may be coincident with the laser optical axis. Mating surfaces on the inner and outer housings are spherically contoured so that the inner housing may be pivoted about the center of the extended sphere of the mating surfaces and thereby pivot the device axis into coincidence with the optical axis of the laser. An end of the crystal modulator is positioned at this spherical center. If the two axes are offset so that the device end at the center of the sphere does not lie on the axis of the outer housing, the entire inner housing and, therefore, its axis may be translated or laterally moved until the spherical center intersects the axis of the outer housing apparatus.

The preferred mechanization includes two sets of four setscrews threaded into the outer housing at its ends and at 90° to each other. One set of screws is disposed to contact the inner housing directly. The other set of screws is disposed to contact a ring whose inner surface comprises one of the spherical surfaces. By adjustment of the screws, the axis of the inner housing may be linearly moved in a radial direction toward the laser optical axis until at least the laser optical axis and the inner housing axis and, specifically, the crystal modulator's axis intersect at the centerpoint of the spherical surfaces. The set of setscrews distanced from the spherical surfaces have been adjusted to pivot the axis of the inner housing about the centerpoint of the spherical surfaces until the laser and modulator/inner housing axes coincide.

Several advantages are derived from this arrangement. The design is compact and therefore conserves on space, particularly where the environment on which the adjustment must be made has limited space. As a result, the concepts of the present invention may be incorporated into equipment usable in airborne and space vehicles. The design further is simple and, therefore, amenable to a reliable, yet cost-effective design. Further, its simplicity helps to insulate it from environmental shock and stress.

Other aims and advantages, as well as a more complete understanding of the present invention, will appear from the following explanation of exemplary embodiments and the accompanying drawings thereof.

DETAILED DESCRIPTION OF THE PREFERRED EMBODIMENTS

Figures 1, 2:
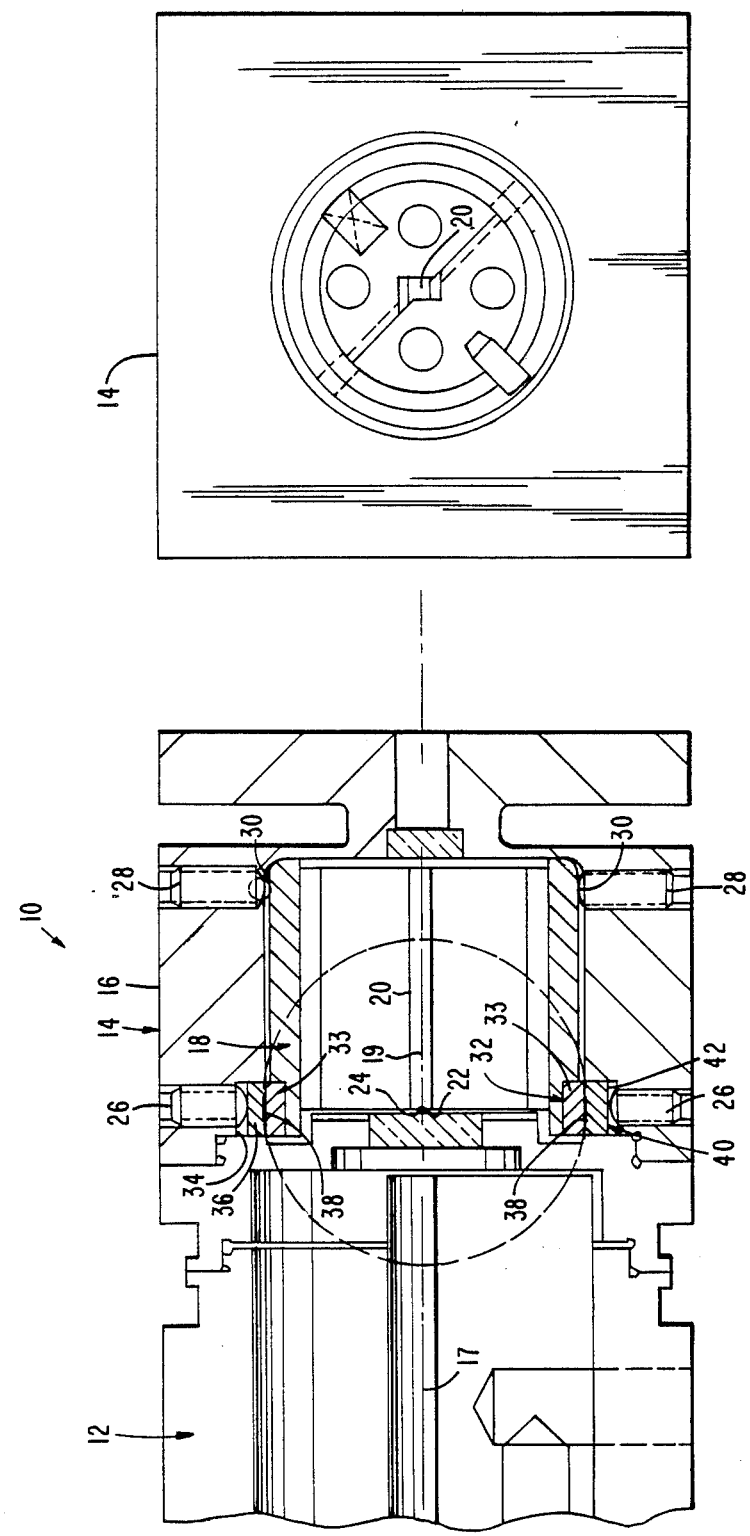
FIG. 1 is a side view, partially in cross-section, illustrating one version of the present invention.
FIG. 2 is an end view of the version shown in FIG. 1.

The versions shown in FIGS. 1 and 2 and in FIGS. 3–7 are primarily different in the construction of a bearing 32 and a pivot ring 36. Therefore, both versions will be discussed together with the differences therebetween being pointed out at appropriate times.

Figure 3:
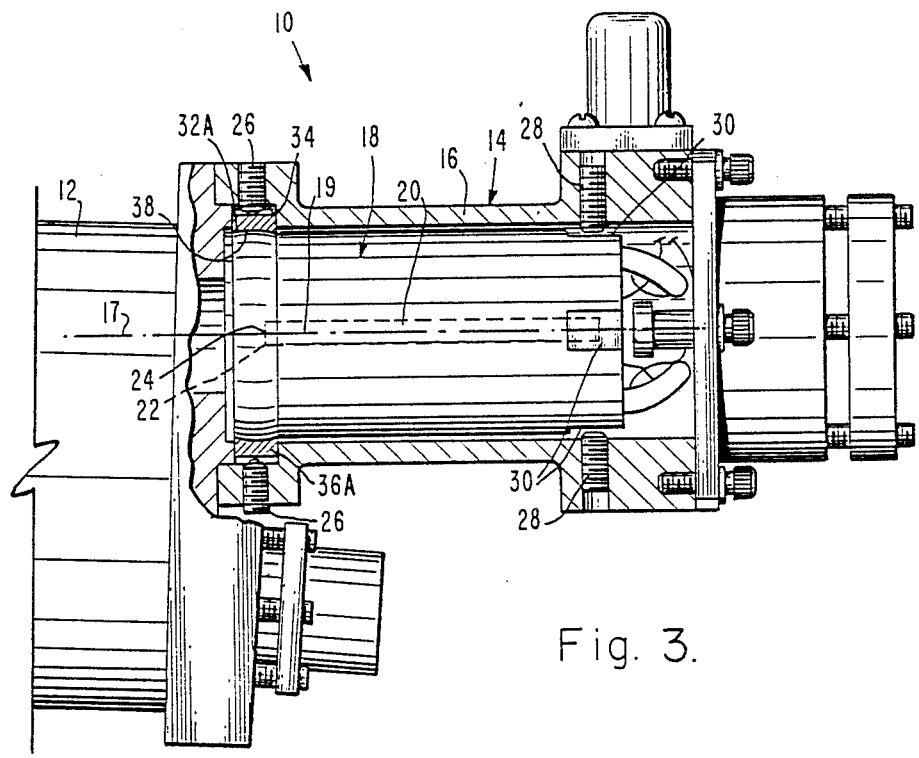
FIG. 3 is a view of a modular layout of the engineered version of the present invention in cross-section.
Figure 6:
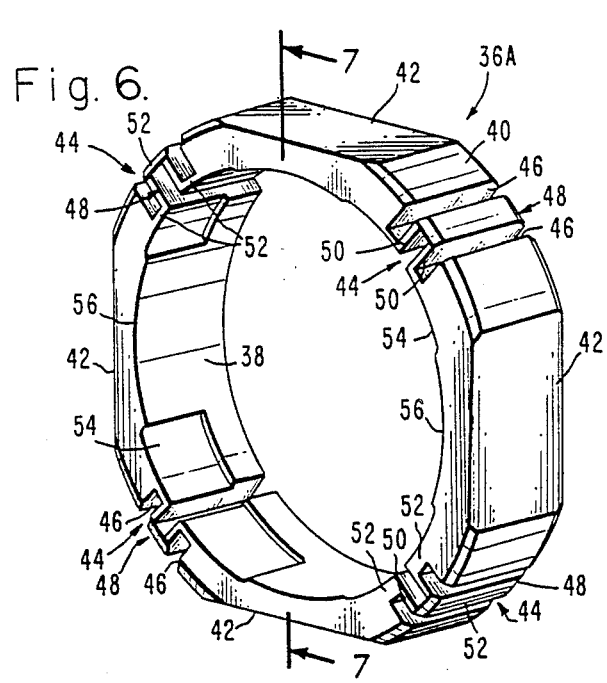
FIG. 6 is a perspective view of an adjusting pivot ring used in the embodiment depicted in FIG. 3.
Figure 7:
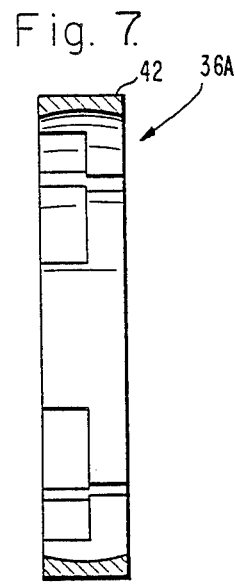
FIG. 7 is a cross-sectional view of the ring illustrated in FIG. 6 taken along lines 7—7 thereof.

Accordingly, referring now to FIGS. 1 and 3 a laser and crystal modulator apparatus 10 comprises a laser 12 having an optical axis 17 and a modulator assembly 14. Modulator assembly 14 includes an outer housing 16 securely coupled to laser 12 and an inner housing 18 having an axis 19. Thus, laser optical axis 17 is fixed with respect to outer housing 16 when the two are secured together, but axis 17 need not be coincident with the axis of the outer housing. A modulator crystal 20 is secured within inner housing 18 in a conventional manner with its end 22 positioned at a center 24 of a spherical arrangement, which will be further described hereinafter. The modulator crystal has an axis which is coincident with inner housing axis 19.

Outer housing 16 is provided with two sets of screws 26 and 28, each set preferably comprising four screws placed 90° from one another which lie in intersecting planes, so that the diametrically opposed screws of both sets 26 and 28 lie in their respective planes. For maximizing the adjustment and positioning capabilities, two sets 26 and 28 are placed at opposite ends and in threaded engagement with outer housing 16.

Figure 4:
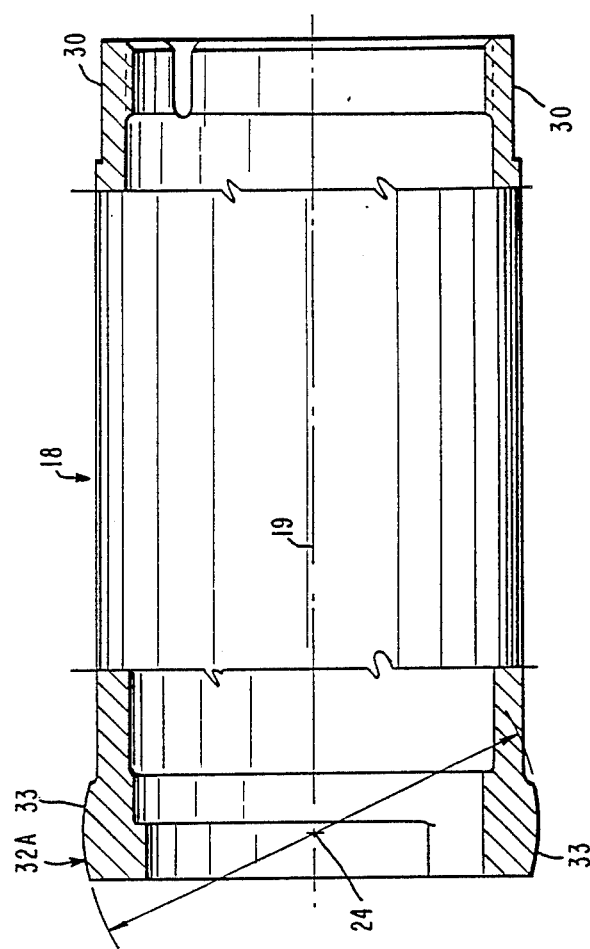
FIG. 4 is a cross-sectional view of an inner housing of the embodiment of FIG. 3.
Figure 5:
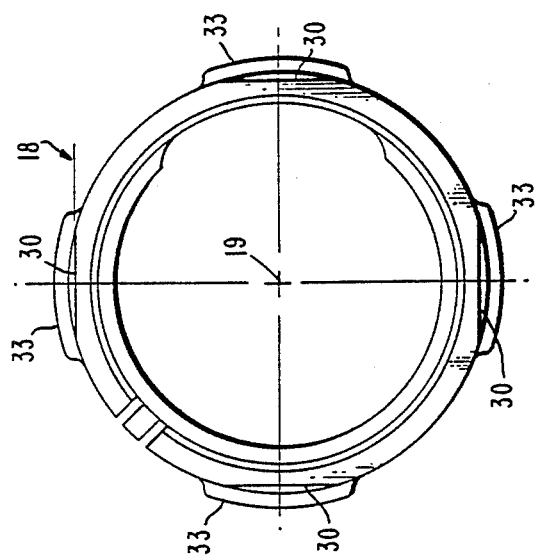
FIG. 5 is an end view of the inner housing shown in FIG. 4.

As shown also in FIGS. 4 and 5, inner housing 18 is provided with four planar surfaces 30 (see FIG. 5), which are placed orthogonally with respect to one another and about the periphery of the inner housing. Surfaces 30 extend in planes which are generally parallel to inner housing axis 19. Set of screws 28 are disposed to contact their respective planar surfaces 30 and, when so contacting, prevent rotation of the inner housing about its axis 19.

At the other end of inner housing 18 is bearing 32 for the version of FIGS. 1 and 2 and bearing 32A for the version of FIGS. 3–7. Bearings 32 and 32A are split into four segments 33 whose collective exterior surfaces are generally of annular configuration, having a spherically contoured periphery centered at center 24. The difference between bearings 32 and 32A is that the former is separate and bonded to the inner housing while the latter is formed integral with housing 18.

Outer housing 16 at its end at screw sets 26 has an interior space 34 in which is placed pivot rings 36 and 36A respectively of the two versions, having an internal spherical surface 38 and an outer surface 40. Four orthogonally placed planar surfaces 42 are formed on outer surface 40 and are disposed for contact by the respective screws of set 26. In the annular configuration of pivot ring 36A are four discontinuities 44 defined by pairs of ends 46, which are joined together by an elastically deformable section 48. Section 48 comprises a pair of generally parallel radial segments 50 and three lateral segments 52. The lateral segments are joined generally normal to the radial segments to join termini at one end of the radial segments to one another and the other termini of segments 50 respectively to ends 46 of the ring discontinuities.

In practice, pivot ring 36A is uniformly crimped about its periphery to reduce its diameter such that its internal spherical surface 38 is slightly smaller in dimension than the external peripheral surface of bearing 32, segments 50 being slightly bent in the process of crimping. Section 48, now because of its construction, is elastically deformable and insures intimate contact of internal spherical surfaces 38 of the pivot ring with the external spherical surfaces of segments 33 of bearing 32A. This yieldable configuration compensates for any slight deviations from tolerance.

Portions of internal spherical surface 38 of pivot ring 36A are also cut away at one side thereof, as denoted by indicium 54. These portions are orthogonally positioned with respect to one another and are configured to meet with orthogonally provided segments 33 of bearing 32. Thus, inner housing 18 may be assembled first within pivot ring 36A by slipping segments 33 within cut-away portions 54 and rotating inner housing 18 through a 45° angle so as to have segments 33 reside within non-cut away portions 56 of pivot ring surface 38. Thereafter, the subassembly of ring 36 and inner housing 18 are slipped into outer housing 16. Then, screwsets 26 and 28 are threaded into respective engagement with planar surfaces 42 and 30. With segments 33 positioned within portions 56, planar surfaces 30 are aligned with respective setscrews 28 which, when in mutual contact, prevents rotation of the inner housing with respect to the pivot ring and outer housing 16.

In the practice of the present invention, to obtain coincidence between axes 17 and 19 of laser 12 and inner housing 18, both sets of screws 26 and 28 are adjusted to laterally translate axis 19 with respect to axis 17 until such point as, at a minimum, the two axes cross at the common center of spherical surface of bearing 32 and pivot ring surface 38. After this minimum intersection of the axes at the spherical centers is completed, screw set 28 is then adjusted to pivot inner housing 18 and its axis 19 about the common spherical center in order to place axes 17 and 19 in coincidence.

Although the invention has been described with respect to particular embodiments thereof, it should be realized that various changes and modifications may be made therein without departing from the spirit and scope of the invention.

What is claimed is:

1. Apparatus for precise positioning of a device comprising:

an inner housing having means for supporting the device on an axis common to said inner housing and the device and having a spherically contoured periphery on an exterior bearing surface;

an outer housing for supporting the inner housing, having an axis fixed with respect to said outer housing and having an annular section on an interior surface of said outer housing, said annular section having an internal spherical surface mated with said spherically contoured periphery; and means coupled between said inner and outer housings for positioning the common axis in coincidence with the fixed axis, said positioning means comprising means for angularly and linearly moving said inner housing and said device and their common axis with respect to said outer housing and its axis to bring the fixed and common axes into the coincidence, and said angular moving means comprising means axially spaced from said spherically contoured surfaces for angularly adjusting the common axis with respect to the fixed axis.

2. Apparatus according to claim 1 in which said axially spaced means comprise:

planar surfaces placed on and about the periphery of said inner housing and respectively extending generally parallel to the common axis;

a first set of screws threadedly engaged with said outer housing and extending radially towards said inner housing respectively in contact with said peripheral planar surfaces of said inner housing, both to pivot said inner housing and its common axis with respect to said outer housing and the fixed axis and to prevent rotation of said inner housing about its common axis with respect to said outer housing.

3. Apparatus according to claim 1 in which said annular section of said outer housing comprises a pivot ring coupled thereto.

4. Apparatus for precise positioning of a device comprising:

(a) an inner housing having means for supporting the device on an axis common to said inner housing and the device, and integral segments spaced from one another respectively having annular spherical outer surfaces;

(b) an outer housing for supporting the inner housing, said outer housing having an axis fixed therewith and an annular section with an internal spherical surface mated with said spherical outer surfaces for enabling rotation, angular movement and radial movement between said inner and outer housings; and (c) means axially spaced from said spherical inner and outer surfaces for angularly adjusting the common axis with respect to the fixed axis, said axially spaced means (c), including (1) planar surfaces placed on and about the periphery of said inner housing and respectively extending generally parallel to the common axis, (2) a first set of screws threadedly engaged with said outer housing and extending radially towards said inner housing respectively in contact with said peripheral planar surfaces of said inner housing, both to pivot said inner housing and its common axis with respect to said outer housing and the fixed axis and to prevent rotation of said inner housing about its common axis with respect to said outer housing, thereby to permit the rotation and angular movement between said inner and outer housings prior to engagement of said screws with said inner housing peripheral planar surfaces and a locked non-rotational interengagement between said inner and outer housings after engagement of said screws with said inner housing peripheral planar surfaces.

5. Apparatus according to claim 4 in which said annular section of said outer housing comprises a pivot ring having a coupling thereto, said coupling including:
   planar surfaces placed on and about the periphery of said pivot ring and respectively extending generally parallel to the fixed axis;
   a second set of screws threadedly engaged with said outer housing and extending radially towards said pivot ring and said inner housing respectively in contact with said peripheral planar surfaces of said pivot ring, in part, to prevent rotation of said inner housing about its common axis with respect to said outer housing,
   said first and second sets of screws operable to axially displace said inner housing with respect to said outer housing to enable axial coincidence between the fixed and common axes.

6. Apparatus for precise positioning of a modular crystal having an end, comprising:
   an inner housing having means for supporting the crystal on an axis common to said inner housing and the crystal, and an integral bearing defining an annular spherical surface on whose center the crystal end is positioned;
   an outer housing for supporting the inner housing, and an axis fixed with respect to said outer housing, said outer housing being coupled to a laser having an optical axis which is coincident with the laser optical axis; and
   means coupled between said inner and outer housings for positioning the common axis in coincidence with the fixed axis, said positioning means comprising means for angularly and linearly moving said inner housing and said crystal and their common axis with respect to said outer housing and its axis to bring the fixed and common axes into the coincidence.

7. A method for precise positioning of a device having an axis comprising the steps of:
   supporting the device on its axis;
   supporting the device in a housing having an axis; and
   positioning the device axis in coincidence with the housing axis to angularly and linearly move the device and its axis with respect to the housing and its axis to bring the respective axes thereof into the coincidence, by
   securing the device to a spherically contoured periphery,
   mating an internal spherical surface of the housing with the spherically contoured periphery, and
   angularly adjusting the device axis with respect to the housing axis by means axially spaced from said spherically contoured surfaces.

8. A method according to claim 7 further comprising the step of placing a pivot ring between the housing and the spherically contoured periphery and maintaining the pivot ring in yieldable engagement with the spherically contoured periphery.

* * * * *

UNITED STATES PATENT AND TRADEMARK OFFICE
CERTIFICATE OF CORRECTION

PATENT NO. : 4,938,564
DATED : July 3, 1990
INVENTOR(S) : Charles Romero

It is certified that error appears in the above-identified patent and that said Letters Patent is hereby corrected as shown below:

Please amend the application as follows:

IN THE SPECIFICATION

Col. 1, line 3, add the follow sentences.

--This invention was made with government support under Contract No. F33657-83-C-2134 awarded by the Department of the Air Force. The Government has certain rights in this invention.--

Signed and Sealed this

Twentieth Day of May, 1997

Attest:

BRUCE LEHMAN

Attesting Officer

Commissioner of Patents and Trademarks